Figure 1:
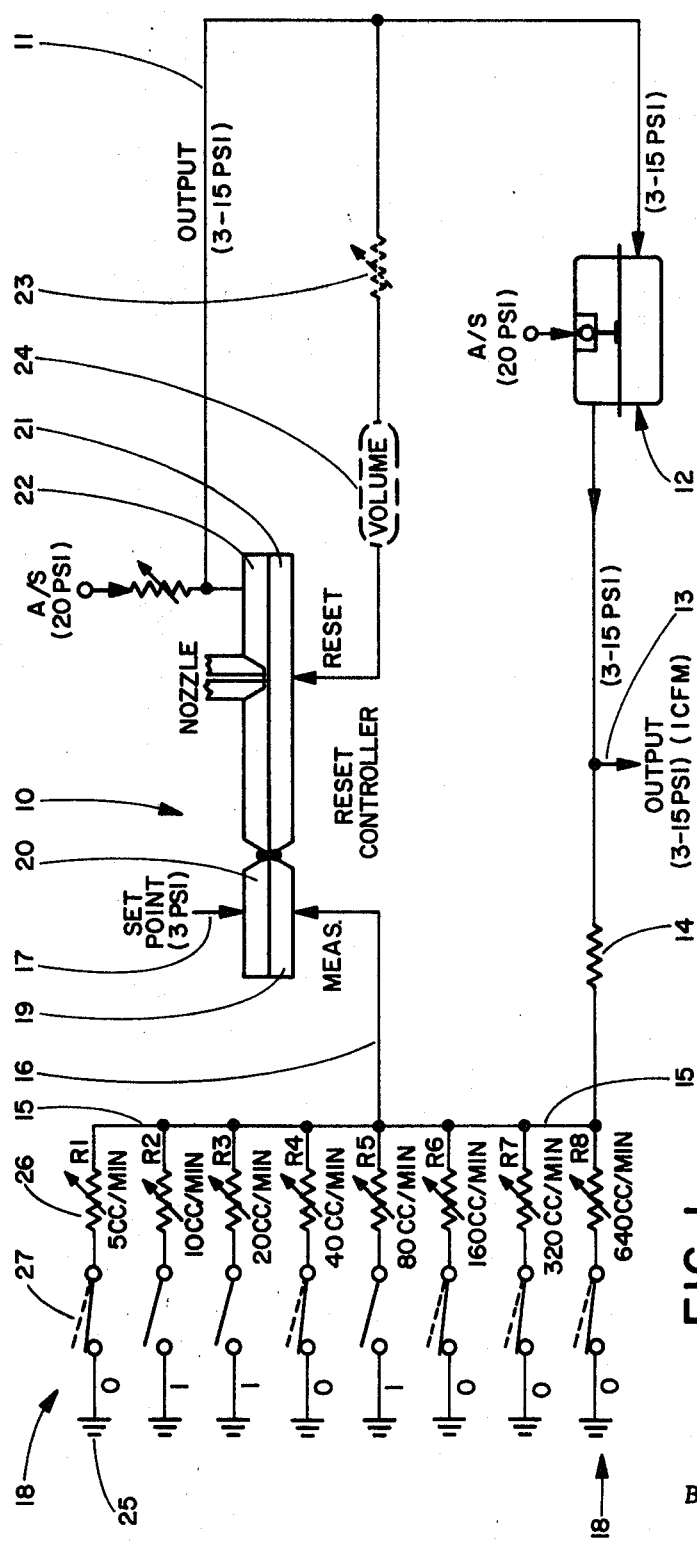

United States Patent

[11] 3,601,308

| [72] | Inventor | Richard W. Hatch, Jr.<br>Foxboro, Mass. |
|---|---|---|
| [21] | Appl. No. | 835,312 |
| [22] | Filed | June 19, 1969 |
| [45] | Patented | Aug. 24, 1971 |
| [73] | Assignee | The Foxboro Company<br>Foxboro, Mass. |

[54] DIGITAL TO PNEUMATIC ANALOG CONVERTER
1 Claim, 2 Drawing Figs.

[52] U.S. Cl. .................................................. 235/200,
    137/81.5, 340/347 DA
[51] Int. Cl. .................................................. G06d 3/00
[50] Field of Search .......................................... 340/347
    DA; 235/200, 201; 137/81.5, 83, 85

[56] References Cited
UNITED STATES PATENTS

| 3,156,157 | 11/1964 | Smith et al. ................. | 235/201 ME |
| 3,164,065 | 1/1965 | Franz ........................... | 235/201 ME X |
| 3,281,832 | 10/1966 | Schwartz ..................... | 340/347 AD |
| 3,433,257 | 3/1969 | Jensen ......................... | 235/201 ME X |
| 3,491,229 | 1/1970 | Mityashin et al. ........... | 235/201 |
| 3,528,444 | 9/1970 | Hass ............................ | 137/81.5 |

*Primary Examiner*—Maynard R. Wilbur
*Assistant Examiner*—Michael K. Wolensky
*Attorney*—Lawrence H. Poeton ABSTRACT: The combination of a digital input matrix of fluidic resistances and a pneumatic analog controller, with a manifold supply to the resistances maintained at constant pressure by the controller, and a pneumatic analog output to a value established by the controller change necessary to maintain the manifold pressure.

PATENTED AUG 24 1971

3,601,308

INVENTOR.
RICHARD W. HATCH JR.
BY
Lawrence H. Phelan
AGENT 3,601,308

DIGITAL TO PNEUMATIC ANALOG CONVERTER

This invention relates to converters, and has particular reference to digital to pneumatic analog converters for use in process and/or energy instrumentation.

In modern uses of such instrumentation, the most effective systems need to combine the uses of the best means to accomplish the functions of different portions of the instrumentation. For example, digital means where it is most effective, and analog means where it is most effective. Such combinations may be the result of total planning of new systems, or may result as the best use of available equipment and systems.

Because of this situation, there is increasing need for improved interface systems, such as transducers, and for example, for digital-to-analog converters.

This invention relates to digital-to-analog converters, where the digital input may be pneumatic, electrical or mechanical, and the analog output is pneumatic.

The illustration of this invention, as presented herein, is in the form of a pneumatic system to which digital input signals may be applied, including a pneumatic controller which maintains a fixed pressure at the digital input, and has an analog pneumatic output whose pressure level is representative of the digital input signal, this pressure level being accomplished through operation of the pneumatic controller in the course of its changes as necessary to maintain the fixed pressure at the digital input.

This invention lends itself to thin sandwich construction of a nature to allow systems in the direction of simplicity and miniaturization.

An example of this form is in the illustration of the controller of this invention. It is of the nature of the disclosure in patent application to Prescott et al., Ser. No. 772,787, filed Nov. 1, 1968 and entitled Pressure Device Having Layered Construction and Pivoting Seal with Operator. The abstract of the disclosure of this patent application is as follows:

In a multilayer sandwiched type of construction, an operator activated by at least one pressure chamber is brought through a sealing configuration which also provides for pivoting of the operator; the operator itself is formed from a layer of the sandwiched construction and the sealing at the operator pivot is formed from sealing layers of the sandwiched construction; the operator layer may be backed by a resilient sheet layer for sealing the pressure chamber actuating the operator; this construction may be readily adapted to a plurality of pressure chambers employed in conjunction with motion-sensing devices, or alternatively weight and springs, to perform the functions of alarms, relays, repeaters, amplifiers, and a variety of other pneumatic devices.

The illustration herein is of an eight-bit digital-to-analog pneumatic converter which accepts parallel binary inputs, and transmits a 3–15 p.s.i. analog signal.

One application of this converter is in a fluidic programmer, and it is capable of accepting low level fluidic signals for such purpose. It may be used in conjunction with a punched card and pneumatic reader, to control rates, set points, or values in an analog fashion.

Figure 2:
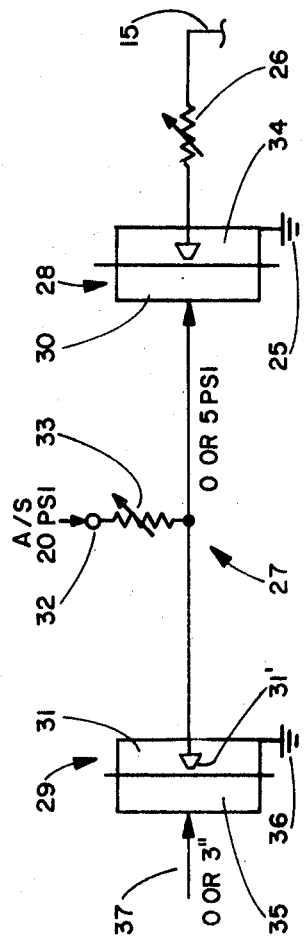

Other objects and advantages of this invention will be in part apparent and in part pointed out hereinafter and in the accompanying drawings, wherein:

FIG. 1 is a schematic illustration of a converter system according to this invention; and FIG. 2 is a schematic illustration of a representative digital input element system for use in combination with the converter system of FIG. 1.

The system of FIG. 1 comprises a pneumatic reset controller 10, with a control loop associated therewith including an output passage 11 through a flow booster 12, past an analog output passage from the control loop at 13, through a summation resistor 14, through a supply manifold 15, and finally back to the controller 10 as a measurement input 16, in opposition to a set point input 17 to the controller.

A digital input is generally indicated at 18, and comprises a resistance matrix to the supply manifold 15 such that the individual flows through the individual digital resistances, for a given differential pressure, are in binary ascending ratio, as 1, 2, 4, 8,...etc.

The function of the controller 10 is to maintain the pressure in the supply manifold 15 essentially constant. The resistance matrix 18 is the recipient of digital input signals, whereas the result of the application of a digital input combination to the matrix 18 is a like combination of air bleeds to atmosphere through the specific resistances which are individual to the various units of the particular digital input combination.

The result of each bleeding of air to atmosphere is a tendency to lowering of the pressure in the supply manifold 15. The controller 10 responds, to counteract this tendency, and the amount of this response, as necessary to achieve again a balanced condition in the control loop, is a measure of an analog output through 13, representative of the particular digital combination input signal.

The flow booster 12 provides the volume requirements of the supply manifold 15 and isolates the controller 10 from the loads produced through the digital input resistance matrix 18.

As an example of a controller 10, suitable for the system of this invention, the drawing controller illustration is a representation of one form of the previously mentioned disclosure in the patent application to Prescott et al. In this illustrative application, a proportional-reset controller form is used with pressure chambers 19, 20, 21 and 22 as measurement, setpoint, reset, and supply-bleed chambers respectively. A reset resistance-capacity system 23 and 24 is connected between the chambers 21 and 22, when desirable for stability purposes.

Throughout the drawings, as illustration of one working example, various labels as to flow and pressure are shown. These are not set forth as fixed limits or combinations, but simply as guide line values.

In the Figure 1 resistance matrix 18, there are eight digital bits, each one comprising an air passage from the manifold 15 to atmosphere at 25 through a resistance such as 26, with switch 27 in the passage between the resistance 26 and atmosphere at 25.

Thus, in a digital input of 0 or 1 to the switch 27 the switch 27 may be operated to open or close the passage from the manifold 15 to atmosphere, to close off that particular bit, or to bleed it off to atmosphere as the case may be.

In the showing of FIG. 1, the $R_1$ bit digital input is shown as logic 'zero' and the fluid line is open to flow from the manifold 15 to atmosphere at 25. In the illustrative input showing, the $R_2$ bit has a logic 'one' input and the fluid line is broken from the manifold to atmosphere. As will be seen in FIG. 2, the switch condition of $R_2$ in FIG. 1 involves a shutoff of flow from the manifold to atmosphere so that there is essentially zero air flow from the manifold 15 through $R_2$.

In the Figure 2 showing of the detail of the $R_1$ input digital bit of Figure 1, a pair of diaphragmed capsules 28 and 29 have inner chambers 30 and 31 respectively, both these chambers being supplied with air from a single source 32 through a restrictor 33. This input to chamber 31 is by way of a nozzle 31' which may be adjustable (not shown) toward and away from the diaphragm of capsule 29 to vary the input operation time of the capsule 29.

The diaphragmed capsules 28 and 29 have outer chambers 34 and 35. In capsule 28, the outer chamber 34 is part of the passage from the manifold 15 to atmosphere at 25. In capsule 29, the inner chamber 31 receives the digital input logic 'zero' or logic 'one' through an input passage 37.

Accordingly, as in Figure 2, when the input through 37 is 'zero,' the nozzle 31' is uncovered, and the air supply 32 is bled to atmosphere through chamber 31. As a result, pressure in the chamber 30, of the diaphragm capsule 28, is effectively zero and chamber 34 is open to allow air bleed from the manifold 15 to atmosphere at 25. This equates to the Figure 1 showing of logic bit $R_1$.

Again, in Figure 2, when the input through 37 is 'one' the nozzle 31' is closed by the diaphragm of capsule 29, with the result that pressure builds up in the inner chamber 30 to of diaphragm capsule 28. In consequence, the input to chamber 34 from the manifold 15 is closed off by the diaphragm of capsule 28, and the airflow from the manifold 15 to atmosphere at 25 is stopped. This equates to the Figure 1 showing of logic bit $R_2$.

Similarly in all the Figure 1 logic bits $R_1$ through $R_8$, airflow from the manifold 15 to atmosphere at 25 is shutoff with a digital input of logic 'one,' or allowed with a digital input of logic 'zero.'

This invention, therefore, provides a new and useful digital to pneumatic analog converter, based on the combination of a pneumatic controller and a digital input matrix of resistances in binary ascending ratio for a given differential pressure.

As many embodiments may be made of the above invention, and as changes may made in the embodiment set forth above without departing from the scope of the invention, it is to be understood that all matter hereinbefore set forth and in the accompanying drawings is to be interpreted as illustrative only and not is a limiting sense.

I claim:

1. A converter system wherein a digital pattern of pneumatic signals is automatically translated into a single pneumatic analog signal, said system comprising:

a balance control unit, a set-point input to said control unit, a measurement input to said control unit in opposition to said set-point input, an inwardly facing nozzle in said control unit and connecting the interior of said control unit to atmosphere, movable means responsive to the differential of said set-point input and said measurement input to variable restrict said nozzle, and air supply inlet to said control unit and connectable to atmosphere through said nozzle, and a restrictor in said air supply inlet;

an output from said air supply inlet at a point between said air supply restrictor and said control unit;

a system pneumatic loop from said output connection to said measurement input;

a reset connection from said output connection to said control unit in opposition to said nozzle;

a pneumatic booster in said system loop between said reset connection and said measurement input;

a pneumatic-working output connection from said system loop between said pneumatic booster and said measurement input;

a series connected pneumatic summation restrictor in said system loop between said working output connection and said measurement input;

a series connected pneumatic manifold in said system loop between said summation restrictor and said measurement input; and a bank of digital pneumatic elements set up in parallel with each other as a digital pattern input to said converter system;

each of said elements comprising a connection assembly from said manifold to atmosphere and each of said assemblies comprising a pneumatic restrictor between said manifold and atmosphere as one of a group of digital matrix restrictors and a digital pneumatic switch unit between said element restrictor and atmosphere;

each of said pneumatic switch units comprising:

a first module with a diaphragm therein dividing it into a chamber connected to atmosphere and a dead-end control chamber;

a second module with a diaphragm therein dividing it into a chamber connected to atmosphere and a dead-end signal input chamber;

a nozzle in said first module atmosphere connected chamber, said module nozzle being closable by said first module diaphragm and said nozzle connected to said digital matrix restrictor;

a digital signal input to said second module signal input chamber;

an air supply inlet including a pneumatic supply restrictor;

a connection from said air supply inlet to said first module dead-end control chamber;

a nozzle in said second module atmosphere connected chamber and closable by said second module diaphragm; and a connection from said air supply inlet to said second module nozzle;

whereby when no input signal is applied to said second module, said air supply inlet is bled to atmosphere through said second module and said manifold is bled to atmosphere through said first module;

when an input signal is applied to said second module, said second module nozzle is closed and a back-pressure control signal therefrom is applied to said first module to close said first module nozzle; and whereby a digital input signal pattern applied to said bank of digital elements results in a representative analog output signal from said system loop.